United States Patent

Hayashi et al.

[11] Patent Number: 5,595,525
[45] Date of Patent: Jan. 21, 1997

[54] NUMERICALLY CONTROLLED GRINDING MACHINE

[75] Inventors: Yutaka Hayashi, Chiryu; Makoto Nonoyama, Kariya, both of Japan

[73] Assignee: Toyoda Koki Kabushiki Kaisha, Kariya, Japan

[21] Appl. No.: 541,426

[22] Filed: Oct. 10, 1995

[30] Foreign Application Priority Data

Oct. 11, 1994 [JP] Japan .................................. 6-245590

[51] Int. Cl.⁶ .............................. B24B 49/00; B24B 51/00
[52] U.S. Cl. ............................. 451/5; 364/474.06; 451/8; 451/10
[58] Field of Search ...................... 340/680; 364/474.02, 364/474.06, 474.12, 474.14, 474.16, 474.22, 474.33; 451/5, 8, 10, 49, 57

[56] References Cited

U.S. PATENT DOCUMENTS

| | | | |
|---|---|---|---|
| 3,603,044 | 9/1971 | Price | 451/8 X |
| 4,293,913 | 10/1981 | Nishimura et al. | 451/8 X |
| 4,709,509 | 12/1987 | Yoneda et al. | 451/8 X |
| 5,076,022 | 12/1991 | Ohta et al. | 451/8 X |
| 5,361,470 | 11/1994 | Hamada et al. | 451/5 X |
| 5,441,438 | 8/1995 | Bishop | 451/8 X |
| 5,509,848 | 4/1996 | Shimbara | 451/5 X |

*Primary Examiner*—Timothy V. Eley
*Attorney, Agent, or Firm*—Oblon, Spivak, McClelland, Maier & Neustadt, P.C.

[57] ABSTRACT

A numerically controlled grinding machine of the present invention grinds a cylindrical surface of a workpiece by a relative movement between the workpiece and a grinding wheel. The grinding conditions such as a grinding method and a finishing diameter of the workpiece are inputted so that data necessary for grinding the Workpiece are automatically determined in dependence upon the grinding conditions. The automatically determined grinding data are displayed on a display means. The grinding data displayed on the display means are modified by one of the four rules of arithmetic. The modification are carried out in accordance with a compensation rate set by override switch and the like or a compensation value inputted by a key operation.

11 Claims, 7 Drawing Sheets

TO NEXT STEP PORTION

FIG. 4

GRINDING DATA TABLE

| | ROUGH GRINDING SPEED | FINE GRINDING SPEED | FINE GRINDING START POSITION | ROUGH GRINDING SPINDLE SPEED | FINE GRINDING SPINDLE SPEED | FINISHING DIAMETER |
|---|---|---|---|---|---|---|
| STEP NO. 1 | ****** | ****** | ****** | ****** | ****** | ****** |
| STEP NO. 2 | ****** | ****** | ****** | ****** | ****** | ****** |
| STEP NO. 3 | ****** | ****** | ****** | ****** | ****** | ****** |

F1   F2   F3

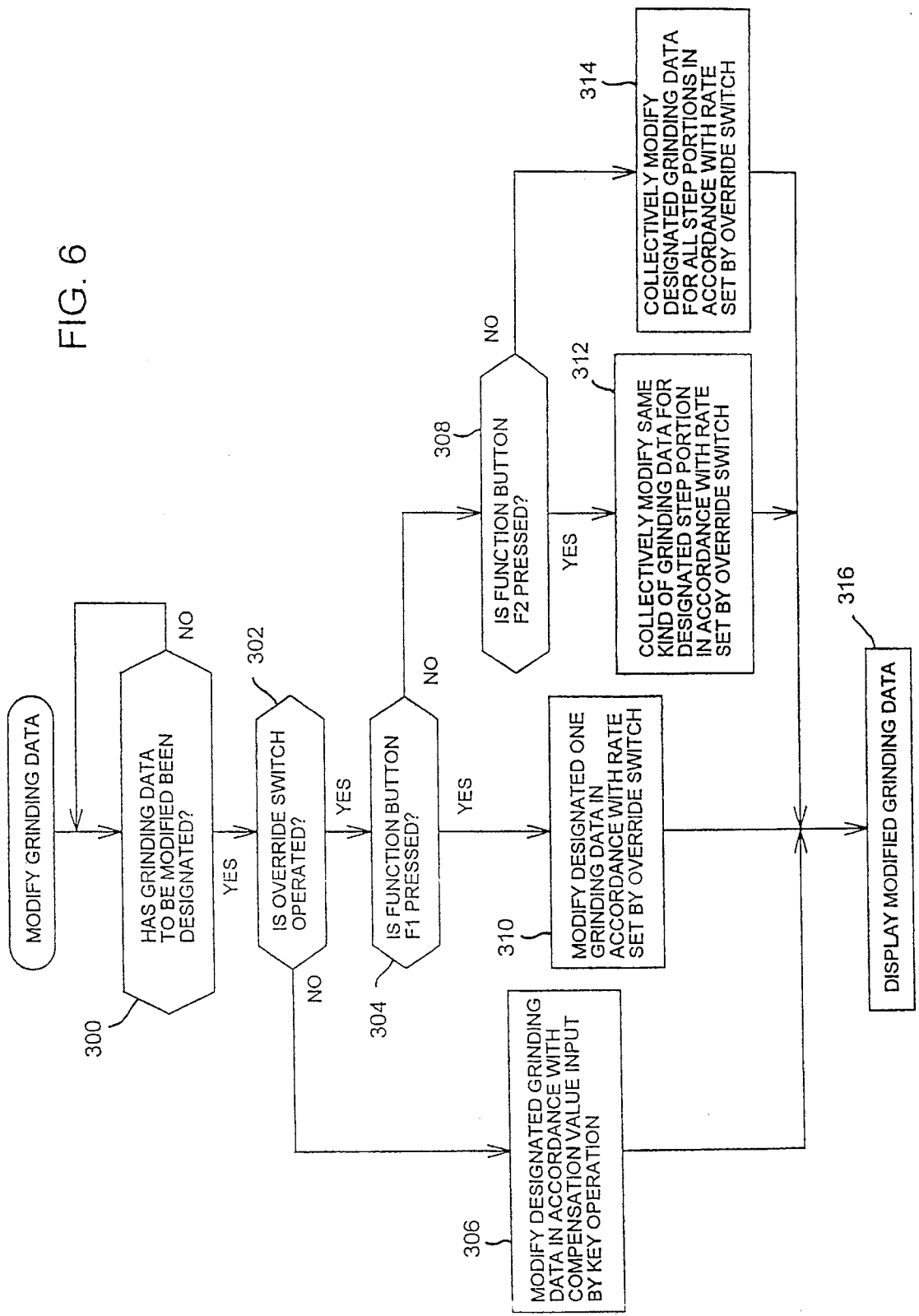

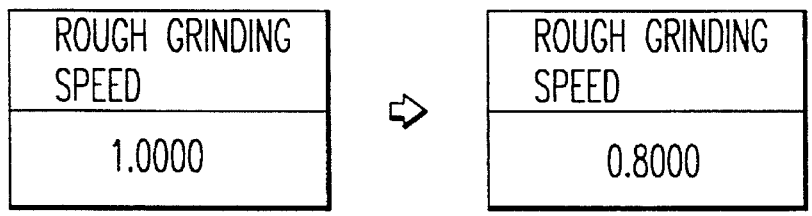
FIG. 7A
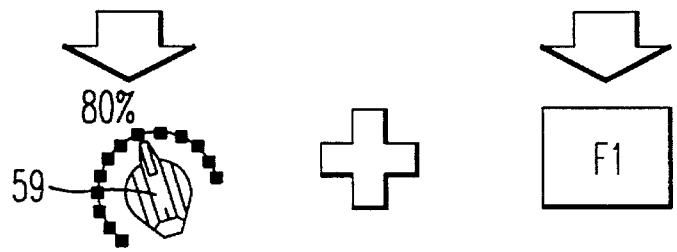
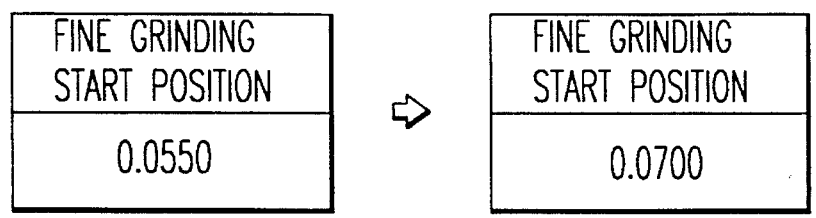
FIG. 7B
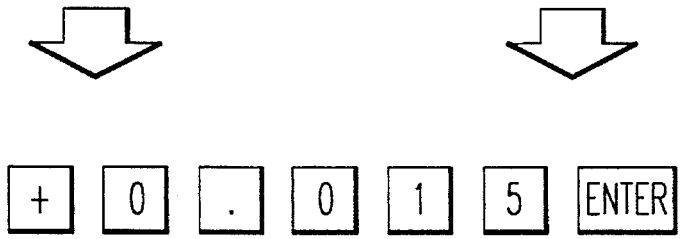
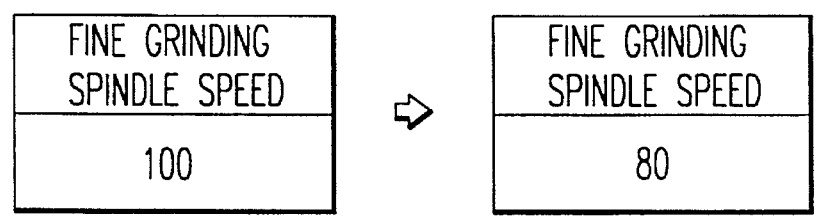
FIG. 7C
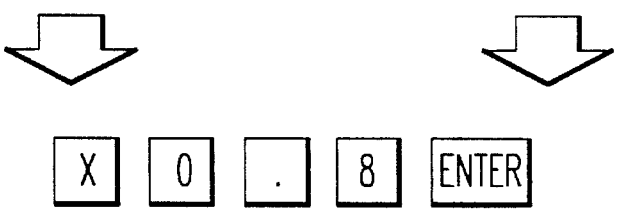

NUMERICALLY CONTROLLED GRINDING MACHINE

FIELD OF THE INVENTION

The present invention relates to a numerically controlled machine tool such as a grinding machine which enables an operator to easily and correctly modify data necessary for grinding a workpiece.

DISCUSSION OF PRIOR ART

Generally, in numerically controlled grinding machines, various numerical data which are used in controlling the grinding machine in accordance with a numerical control program are inputted by a key operation. When an operator inputs a grinding method, a finishing diameter and the like, grinding data are automatically determined. However, it is sometimes the case that a desired accuracy can not be obtained under the grinding data which are automatically determined. In this case, the operator has to modify the automatically determined grinding data such as grinding speed, grinding start position and spindle rotational speed.

In a grinding machine having an interactive numerical controller, the number of times of the key operation reduces to facilitate preparation of the numerical control program. Even in such a grinding machine, the operator must input all of numerical values of the modified grinding data by the key operation.

However, some problems may arise in the modification of the grinding data performed by the key operation. For instance, when the grinding start position is to be modified from "0.0550" millimeters to "0.0700" millimeters, the operator often inputs their numerical values with misplacing a figure. Further, since the operator must input all of the numerical values of the modified grinding data, the number of times of the key operation increases, resulting in being troublesome for the operator.

Additionally, in a grinding machine wherein one grinding wheel grinds a workpiece having a plurality of portions to be ground, it is rare that modification of the grinding data for only one portion are sufficient to complete the whole data modification. In most cases, the same kind of grinding data as the one portion must be also modified for all portions to be ground. Conventionally, the operator repeatedly performed the modifying operation for all portions to be ground. This causes a low operating efficiency.

SUMMARY OF THE INVENTION

An object of the present invention is to provide an improved numerically controlled grinding machine which enables an operator to easily and correctly modify data necessary for grinding a workpiece.

Another object of the present invention is to provide an improved numerically controlled grinding machine which can reduce the number of times of key operation by the operator to complete the whole data modification in a short period of time for a workpiece having a plurality of step portions to be ground.

According to a first aspect of the present invention, a numerically controlled grinding machine comprises means for inputting grinding conditions, means for automatically determining data necessary for grinding the workpiece in dependence upon the inputted grinding conditions, means for displaying the automatically determined grinding data, and means for modifying the grinding data displayed on the display means by one of the four rules of arithmetic.

With this configuration, the automatically determined grinding data are displayed on the display means. In this state, a cursor on the display means is moved to designate the grinding data to be modified and then, data modification is performed by instructed one of the four rules of arithmetic, i.e., addition, subtraction, multiplication and division. This improves an operating efficiency.

According to a second aspect of the present invention, a compensation rate is instructed by a volume setting means, and the designated grinding data is modified in accordance with the compensation rate. It is therefore not necessary for the operator to input all of the numerical values of the modified grinding data.

According to a third aspect Of the present invention, the grinding data designated by the cursor and the same kind of grinding data as that, e.g., a rough grinding speed and a fine grinding speed are collectively modified for the designated portion of the workpiece. The operator is not required to input modified grinding data one by one for a plurality of portions of a workpiece.

According to a fourth aspect of the present invention, the designated grinding data are collectively modified for all portions to be ground. The third and forth aspects of the present invention relieves the operator of the modifying operation. The data modification can be attained by a simplified operation.

BRIEF DESCRIPTION OF THE ACCOMPANYING DRAWINGS

Various other objects, features and many of the attendant advantages of the present invention will be readily appreciated as the same becomes better understood by reference to the following detailed description of the preferred embodiment when considered in connection with the accompanying drawings, in which:

FIG. 1 is a schematic plan view of a numerically controlled grinding machine, also illustrating the configuration of the numerical controller according to the present invention;

FIGS. 2(a)–(e) are explanatory views illustrating steps for automatic determination of grinding data;

FIG. 4 is a data table of the grinding data displayed for all step portions of a workpiece to be ground;.

FIG. 6 is a flowchart illustrating in detail a data modifying step shown in FIG. 5; and FIGS. 7(a)–(c) are explanatory views illustrating actual input operations performed by an operator for modifying each grinding data.

DETAILED DESCRIPTION OF PREFERRED EMBODIMENT

An embodiment of the present invention will now be described with reference to the attached drawings.

Figure 1:
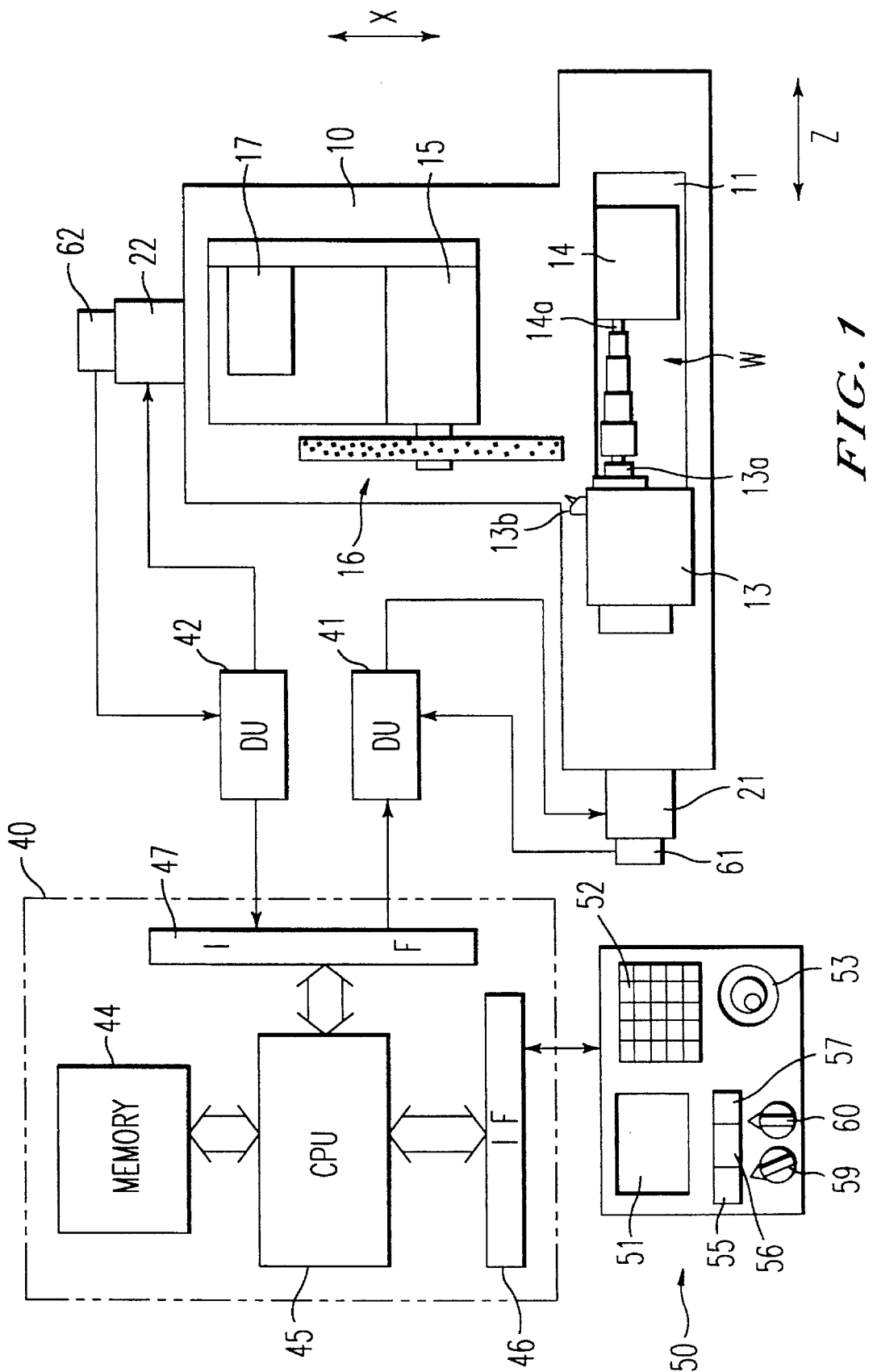

FIG. 1 shows a numerically controlled grinding machine embodying the concept of the present invention. This machine has a bed 10 on which a work table 11 is supported for movement in Z-axis direction. A headstock 13 and a tailstock 14 are mounted on the work table 11 to face each other. The headstock 13 is provided with a chuck 13a for holding one end of a workpiece W, while the tailstock 14 is provided with a center 14a for holding the other end of the workpiece W. Thus, the workpiece W is rotatably supported at both ends between the headstock 13 and the tailstock 14 so that the rotational axis thereof is parallel to the Z-axis direction that is a moving direction of the work table 11, and is rotationally driven by the headstock 13. The headstock 13 is further provided with a dresser 13b for dressing a grinding surface of the grinding wheel 16. The workpiece W adopted in the present embodiment has a plurality of step portions to be ground, W1, W2 and W3, as shown in FIGS. 1 and 2.

A wheel head 15 is supported on the bed 10 for movement in X-axis direction that is perpendicular to the Z-axis direction. A grinding wheel 16 is carried on the wheel head 15 for rotation about the axis that is parallel to the Z-axis direction. The grinding wheel 16 is adapted to be rotationally driven by a motor 17 through a not-illustrated belt and pulleys. The work table 11 and the wheel head 15 are respectively moved by servomotors 21 and 22 attached to the bed 10. Encoders 61 and 62 are attached to the servomotors 21 and 22, respectively.

Reference numeral 40 denotes a numerical controller which is composed of a central processing unit 45 (referred to as "CPU" hereinafter), a memory 44 and interfaces 46, 47. An operator's panel 50 is connected to the CPU 45 through the interface 46 to input numerical control program and parameters necessary for the numerical control and and so on. The operator's panel 50 is provided with a display device 51 for displaying grinding data, keyboard 52 through which the data are inputted, a handle 53 for manually feeding the work table 11 and the wheel head 15, start button 55, position storage command button 56, data modification button 57, and two override switches 59 and 60.

The keyboard 52 has numeral keys, control keys, and three function buttons F1, F2 and F3 for indicating the modification manner. The function button F1 is used so as to modify the only one grinding data designated by a cursor. The function button F2 is used so as to collectively modify the grinding data designated by the cursor and the same kind of grinding data as that, for the designated step portion. In case where a rough grinding speed is designated, a fine grinding speed as well as the rough grinding speed are modified. The function button F3 is used so as to collectively modify the designated grinding data for all step portions.

Drive units 41 and 42 (DU) are also connected to the CPU 45 through the interface 47 to drive the servomotors 21 and 22 in response to commands from the CPU 45. Actual positions of the work table 11 and the wheel head 15 detected by the encoders 61 and 62 are respectively fed back to the drive units 41 and 42. In the memory 44, there are formed data memory areas for storing grinding data automatically determined and shape data which are inputted through the operator's panel 50 and so on, and program memory areas for storing programs such as an intermediate dressing program.

The operation of the grinding machine according to the present invention will now be described with reference to FIGS. 2 through 7.

Figure 2A:
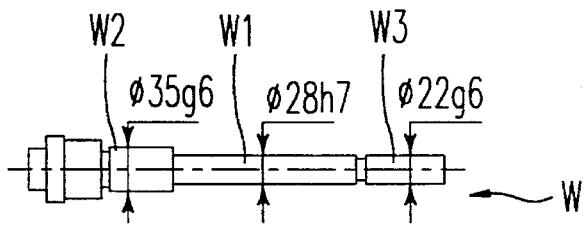
Figure 2B:
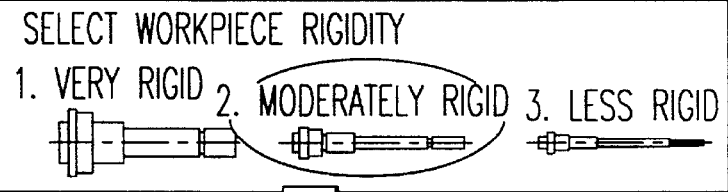
Figure 3:
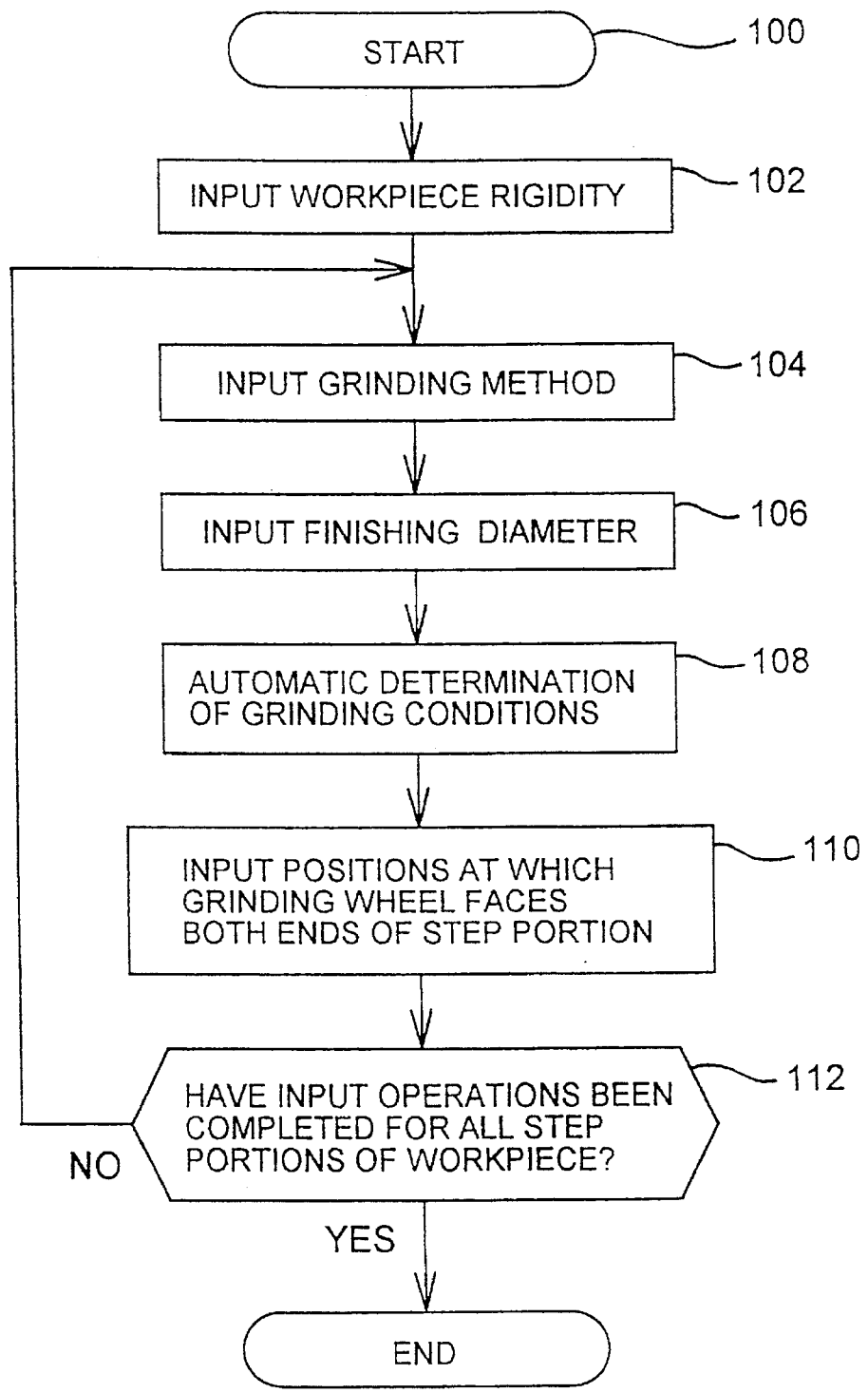
FIG. 3 is a flowchart showing steps for automatic determination of the grinding data, which corresponds to FIG. 2.

FIG. 3 is a flowchart illustrating steps for an automatic determination of the grinding data. When the grinding data are automatically determined for the workpiece W as illustrated in FIG. 2(a), input operation of the shape data of the workpiece W and the grinding conditions are started from step 100. At step 102, the operator inputs a workpiece rigidity while watching a screen displayed on the display device 51. To be concrete, the operator selects the most suitable rigidity from a plurality of grades such as large, moderate, and small in dependence upon the shape of the workpiece W to be ground, and inputs the number assigned to the selected one through the keyboard 52. In this embodiment, the moderate rigidity is selected by inputting number "2", as illustrated in FIG. 2(b). Another method may be adopted for the input of the workpiece rigidity wherein the numerical values of the workpiece rigidity are directly inputted.

Figure 2C:
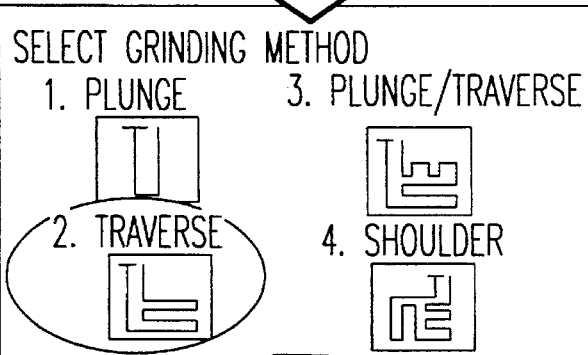

At next step 104, the operator inputs a grinding method through the keyboard 52 while watching the screen displayed on the display device 51. The grinding method is selected from registered patterns, i.e., a plunge grinding, a traverse grinding, a plunge/traverse grinding, and a shoulder grinding. In this embodiment, the traverse grinding is selected by inputting number "2" assigned thereto, as illustrated in FIG. 2(c).

Figure 2D:
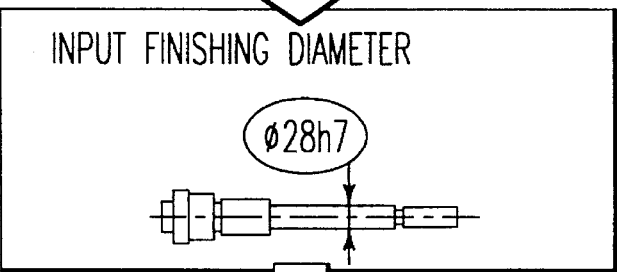

Subsequently, the operator inputs a finishing diameter of a portion W1 of the workpiece W to be ground, at step 106. The diameter of φ28 millimeters is inputted in this embodiment, as illustrated in FIG. 2(d). The input operations of the shape data of the step portion W1 are completed by the aforementioned step 102 through step 106.

The process proceeds to step 108 at which automatic determination of the grinding data are carried out by the numerical controller 40 based upon the shape data inputted at step 102 and the grinding conditions inputted at step 104 and 106. Namely, various grinding data such as a fine grinding start diameter which represents a workpiece diameter at a start of the fine grinding, grinding speeds during the rough grinding and the fine grinding, spindle rotational speed, and the number of times of traverse are automatically determined in dependence upon the workpiece rigidity, the grinding method and the finishing diameter. The automatic determination of the grinding data does not necessarily need the workpiece rigidity. The grinding data may be determined in dependence upon the grinding method and the finishing diameter only.

Figure 2E:
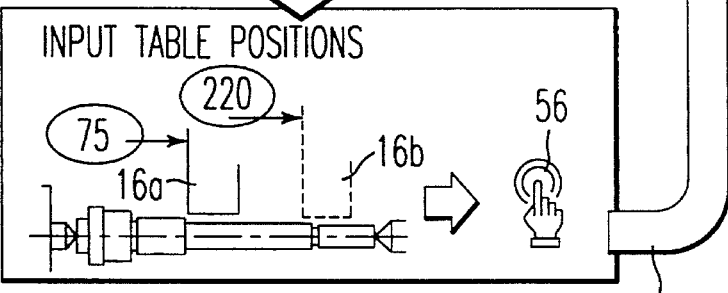

Thereafter, the width of the step portion W1 in the axial direction is inputted by the operator, at step 110. This input operation is carried out by positioning the grinding wheel 16 to the both ends of the step portion W1 by means of the handle 53. As shown in FIG. 2(e), the operator relatively moves the grinding wheel 16 to the position at which the grinding wheel 16 faces the one end of the step portion W1 (this position is illustrated in FIG. 2(e) as the grinding wheel 16a) and presses the position storage command button 56. The position of the one end of the step portion W1 relative to the reference position is calculated based upon the output value of the encoder 61 at this time. The calculated position is stored in the memory 44. Similarly, the operator relatively moves the grinding wheel 16 to the position at which the grinding wheel 16 faces the other end of the step portion W1 (this position is illustrated in FIG. 2(e) as the grinding wheel 16b) and presses the position storage command button 56 once more. The relative position of the other end of the step portion W1 is calculated and stored in the memory 44. During the grinding operation, the grinding wheel 16 is moved in the axial direction between the both ends of the step portion W1 to carry out the traverse grinding. In this case, the positions away from the reference position by 75 millimeters and 220 millimeters are automatically entered.

The input operation for the first step portion W1 is completed, as described above. After that, the process proceeds to step 112 at which it is judged whether the input operations for all step portions to be ground have been completed or not. When there are other step portions to be ground (W2 and W3 in this embodiment), the judgement becomes "NO", so that the process returns to step 104 at which the input operation for the next step portion W2 is carried out in the same manner as the first step portion W1. This input operation is performed for all step portions, whereby the grinding data for all step portions to be ground are automatically determined.

When the input operations for all step portions W1, W2 and W3 to be ground are completed, it becomes such state that the grinding machining of the step portions W1, W2 and W3 can be started upon pressing of the start button 55 under the grinding data automatically determined as described above. FIG. 4 is a data table of the automatically determined grinding data for all step portions which are displayed on the display device 51.

Figure 5:
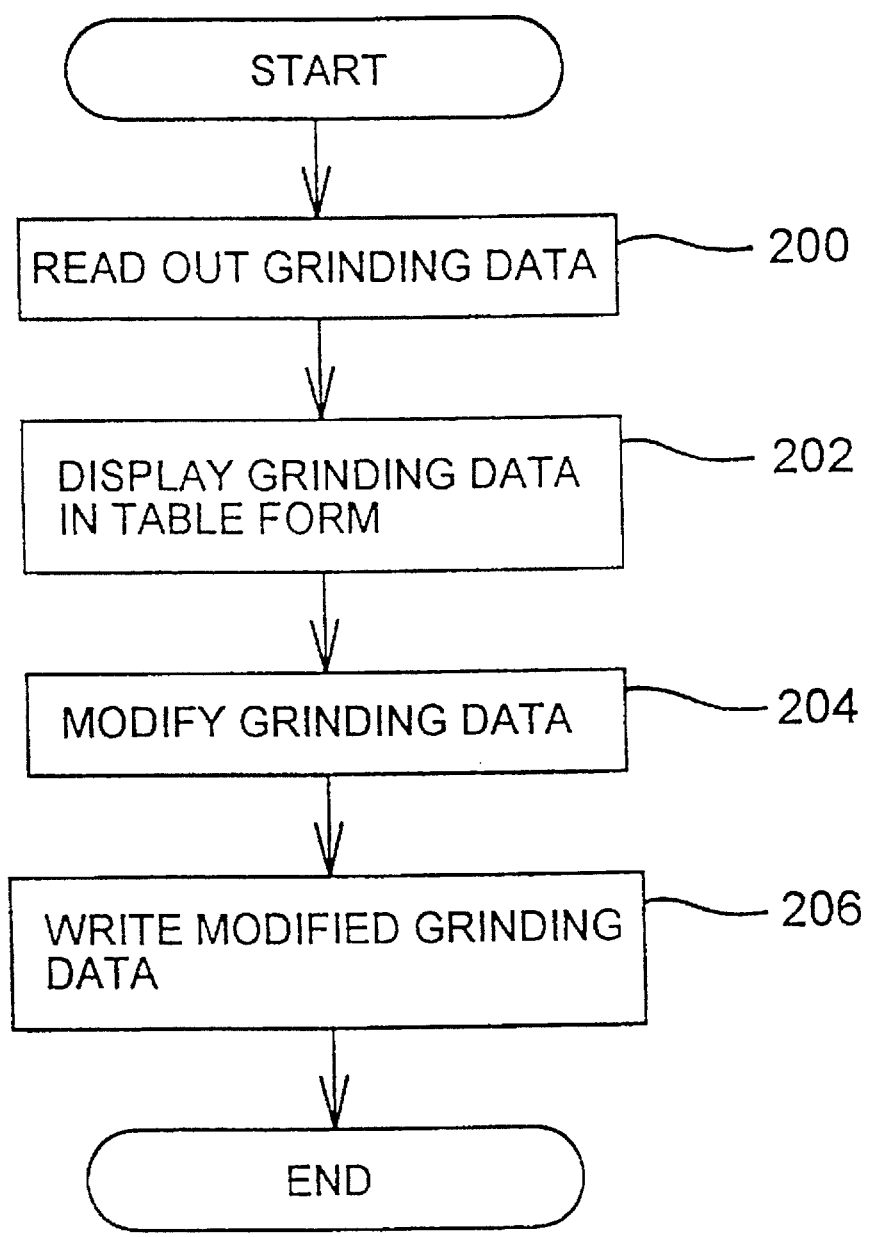
FIG. 5 is a flowchart of a program executed by a central processing unit of a numerical controller for modifying the grinding data.

Even when the workpiece W is ground under the automatically determined grinding data, it sometimes occurs that a desired grinding accuracy can not be obtained. In this case, the grinding data are required to be modified. The modification of the grinding data will be described hereinafter. When the data modification button 57 is pressed to command the data modification, a flowchart shown in FIG. 5 is executed by the numerical controller 40. At first step 200, the grinding data necessary for grinding the workpiece W are read out from the memory 44. These grinding data for all step portions to be ground are displayed on the display device 51 in a table form shown in FIG. 4, at step 202. The grinding data comprise grinding speeds during the rough grinding and the fine grinding, fine grinding start position, spindle rotational speeds during the rough grinding and the fine grinding, the number of times of traverse, and the finishing diameter of the workpiece. At step 204, one or plural grinding data displayed on the display device 51 are modified in the manner described later. Then, the modified grinding data are written and stored in each original address of the memory 44, whereby the operation for modifying the grinding data is terminated.

FIG. 6 is a flowchart showing in detail the data modification executed at step 204 in FIG. 5. In this embodiment, the modification of the speed data such as the grinding speed are carried out by setting the override switch 59 to a desired volume. The grinding data except for the speed data are modified to perform one of the four rules of arithmetic (addition, subtraction, multiplication and division) in accordance with a compensation value instructed through the keyboard 52. Among the three function buttons F1, F2 and F3, the function button F1 is used so as to modify the only one grinding data designated by a cursor 70. The function button F2 is used so as to collectively modify the grinding data designated by the cursor 70 and the same kind of grinding data as that for the designated step portion. The function button F3 is used so as to collectively modify the designated grinding data for all step portions.

At first step 300, it is judged that whether or not the grinding data to be modified is designated by the cursor 70 in the data table displayed on the display device 51. When the judgement is "YES", the process proceeds to step 302. At next step 302, it is judged that whether the override switch 59 is operated or not. When the override switch 59 is operated, the judgement becomes "YES", so that the process proceeds to step 304.

It is then judged at steps 304 and 308 which of the function buttons F1, F2 and F3 is in the pressed state. The process proceeds to steps 310, 312 and 314 when the pressed function buttons are F1, F2, and F3, respectively. At step 310, the only one grinding data designated by the cursor 70 is modified in calculation in accordance with the compensation rate which volume is set by using the override switch 59. At step 312, the grinding data designated by the cursor 70 and the same kind of the grinding data as that for the designated step portion are collectively modified in calculation in accordance with the compensation rate which volume is set by using the override switch 59. At step 314, grinding data designated by the cursor 70 are collectively modified in calculation for all step portions in accordance with the compensation rate which volume is set by using the override switch 59. Next examples are in case where the rough grinding speed for the first step portion is designated by the cursor 70, as shown in FIG. 4. Upon pressing the function button F1, only rough grinding speed for the first step portion is modified. Upon pressing the function button F2, the rough grinding speed and the fine grinding speed for the first step portion are collectively modified. Upon pressing the function button F3, the rough grinding speed for first, second, third step portions are collectively modified.

When the override switch 59 is not operated, the judgement at step 302 becomes "NO", so that the process proceeds to step 306. At step 306, the designated grinding data is modified in calculation by one of the four rules of arithmetic, i.e., addition, subtraction, multiplication and division in accordance with a compensation value which is inputted by the key operation. After calculation at steps 306, 310, 312 and 314, the grinding data which has been modified is displayed on the display device 51 as substitution for each original grinding data.

The operation of the override switch 59 and the key operation for modifying the grinding data will be described concretely with reference FIG. 7(a) through 7(c). FIG. 7(a) shows an example of the operation when the operator desires to modify one rough grinding speed data from "1,000" to "0,800" to make it more slow. In this case, the operator moves the cursor 70 to the rough grinding speed data to be modified, and turns the override switch 59 to the position which represents the volume of 80%, and then presses the function button F1. With the operation of the override switch 59, the calculation (multiplication) of "1.000×0.8" is carried out by the CPU 45 to obtain a modified rough grinding speed data "0.8000". The rough grinding speed data "0.8000" which has been modified is displayed on the display device 51. If the operator presses the function button F2, the same kind of the grinding data as well as the grinding data designated by the cursor 70 are collectively modified for the designated step portion in accordance with the compensation rate which volume is set by using the override switch 59. Furthermore, if the operator presses the function button F3, the grinding data designated by the cursor 70 are collectively modified for all step portions to be ground (W1, W2 and W3 in this embodiment) in accordance with the compensation rate which volume is set by using the override switch 59. Due to the modification by using the override switch 59, the operator is free from numeric representation and calculation. Since it is not required to input all of the numerical values of the modified data "0.8000", the operator is prevented from inputting the numerical values with misplacing a figure. Further, since the number of times of the key operation are reduced, the operator can easily and correctly carry the modification of the grinding data.

FIG. 7(b) shows an example of the operation when the operator desires to modify the data of fine grinding start position. In this case, the operator moves the cursor 70 to the data of the fine grinding start position to be modified and inputs the compensation value therefor through the keyboard 52 so as to modify the designated data by addition or subtraction. For instance, in case where it is desired to make the data of fine grinding start position "0.0550" large by φ0.015 millimeters, the keyboard 52 is operated as "+0.015 enter" by the operator. With this key operation, the calculation (addition) of "0.0550+0.015" is carried out by the CPU 45 to obtain a modified data "0.0700" of the fine grinding start position. The data "0.0700" of the fine grinding start position which has been modified is displayed on the display device 51.

FIG. 7(c) shows an example of the operation when the operator desires to modify the data of fine grinding spindle speed. In this case, the operator moves the cursor 70 to the data of the fine grinding spindle speed to be modified and inputs the compensation value therefor through the keyboard 52 so as to modify the designated data by multiplication or division. For instance, in case where it is desired to make the data "100" of fine grinding spindle speed slightly slow, the keyboard 52 is operated as "×0.8 enter" by the operator. With this key operation, the calculation (multiplication) of "100×0.8" is carried out by the CPU 45 to obtain a modified data "80" of fine grinding spindle speed. The data "80" of the fine grinding spindle speed which has been modified is then displayed on the display device 51.

Needless to say, it is possible to modify the rough grinding speed shown in FIG. 7(a) by such key operation as shown in FIG. 7(c) without using the override switch 59. Similarly, it is possible to modify the fine grinding spindle speed shown in FIG. 7(c) by setting the override switch 59 as shown in FIG. 7(a) instead of the key operation.

The data modification by key operation shown in FIG. 7(b) and 7(c) according to the aforementioned embodiment, the modification of the speed data are carried out by multiplication or division, while the modification of the position data are carried out by addition or subtraction. However, a main characteristic of the present invention is that the operator does not need to input all of the numerical values of the modified grinding data. Therefore, the calculation in the modification may be carried out by any one of the four rules of arithmetic, i.e., addition, subtraction, multiplication and division.

In the aforementioned embodiment, all of the grinding data automatically determined are displayed on the display device 51 in one table form during the modification of the grinding data, as shown in FIG. 4. However, it may be possible that the screen on the display device 51 is scrolled to display the grinding data to be modified.

Further, although only one override switch 59 is used for modifying the rough grinding speed and fine grinding speed in the aforementioned embodiment, the grinding data may be modified by using two override switches 59 and 60 each of which the same kind of speed data are previously assigned to. For example, two override switches are used in such manner that the rough grinding speed and the fine grinding speed are modified by utilizing a volume setting function of the override switch 59, while other speed data, e.g., the rough grinding spindle speed and the fine grinding spindle speed are modified by utilizing a volume setting function of the other override switch 60.

Furthermore, although in the aforementioned embodiment, the speed data are modified by utilizing the volume setting function of the override switch 59, the present invention is not limited to the use of the override switch 59. It is possible to carry out the modification of the data by utilizing other adjustment means. A joystick may be used in such manner that the speed data are modified in accordance with an inclined angle thereof.

As described above, the grinding data are displayed, and the modification of the grinding data is carried out by utilizing the volume setting function of the override switch 59 or by one of the four rules of arithmetic. In this state, the operator is not required to input all of the numerical values of the modified grinding data. Therefore, the number of times of the key operation are reduced, and it is prevented for the operator from inputting the numerical values with misplacing a figure. For these reasons, the operator can easily and correctly carry out the modification of the grinding data.

Besides, in the case where the grinding data for the workpiece having a plurality of portions to be ground are modified, the same kind of grinding data for the designated portion or designated grinding data for all portions can be collectively modified. These advantageously effect on the data modification by the operator.

Obviously, numerous modifications and variations of the present invention are possible in light of the above-teachings. It is therefore to be understood that within the scope of the appended claims, the present invention may be practiced otherwise than as specifically described herein.

What is claimed is:

1. A numerically controlled grinding machine for grinding a cylindrical surface of a workpiece by a relative movement between the workpiece and a grinding wheel, said numerical controlled grinding machine comprising:

means for inputting grinding conditions;

means for automatically determining grinding data necessary for grinding the workpiece in dependence upon the grinding conditions inputted by said input means;

means for displaying the grinding data determined by said determination means; and means for modifying the grinding data displayed on said display means by one of the four rules of arithmetic.

2. A numerically controlled grinding machine for grinding a cylindrical surface of a workpiece according to claim 1, wherein:

said input means comprises means for inputting a grinding method by which the workpiece is ground and means for inputting a finishing diameter of the workpiece; and said determination means determines the grinding data in dependence upon the grinding method and the finishing diameter of the workpiece.

3. A numerically controlled grinding machine for grinding a cylindrical surface of a workpiece according to claim 2, wherein:

said numerically controlled grinding machine is further provided with means for inputting a compensation value of the grinding data; and said modification means calculates in accordance with the compensation value to modify the grinding data.

4. A numerically controlled grinding machine for grinding a cylindrical surface of a workpiece by a relative movement between the workpiece and a grinding wheel, said numerical controlled grinding machine comprising:

means for inputting grinding conditions;

means for automatically determining grinding data necessary for grinding the workpiece in dependence upon the grinding conditions inputted by said input means;

means for displaying the grinding data determined by said determination means;

means for setting a compensation rate of the grinding data;

means for modifying the grinding data displayed on said display means in accordance with the compensation rate set by said rate setting means.

5. A numerically controlled grinding machine for grinding a cylindrical surface of a workpiece according to claim 4, wherein:

said input means comprises means for inputting a grinding method by which the workpiece is ground and means for inputting a finishing diameter of the workpiece; and said determination means determines the grinding data in dependence upon the grinding method and the finishing diameter of the workpiece.

6. A numerically controlled grinding machine for grinding a cylindrical surface of a workpiece according to claim 5, wherein:

said rate setting means is an override switch;

said override switch sets the compensation rate of speed data;

said modification means calculates in accordance with the compensation rate set by said override switch to modify the speed data.

7. A numerically controlled grinding machine for grinding plural step portions of a workpiece by a relative movement between the workpiece and a grinding wheel, said numerical controlled grinding machine comprising:

means for inputting a grinding method of each step portion;

means for inputting a finishing diameter of each step portion; and means for automatically determining data necessary for grinding each step portion in dependence upon said inputted grinding method and the finishing diameter of each step portion;

means for displaying the grinding data for each step portion which are automatically determined by said determination means; and means for collectively modifying plural grinding data displayed on said display means by one of the four rules of arithmetic.

8. A numerically controlled grinding machine for grinding plural step portions of a workpiece according to claim 7, wherein said modification means collectively modify the same kind of grinding data for each step portion.

9. A numerically controlled grinding machine for grinding plural step portions of a workpiece according to claim 7, wherein said modification means collectively modify the same grinding data for all step portions.

10. A numerically controlled grinding machine for grinding plural step portions of a workpiece according to claim 7, wherein:

said numerically controlled grinding machine is further provided with means for setting a compensation rate of the grinding data; and said modification means calculates in accordance with the compensation rate set by said rate setting means to modify the plural grinding data collectively.

11. A numerically controlled grinding machine for grinding plural step portions of a workpiece according to claim 7, wherein:

said numerically controlled grinding machine is further provided with means for inputting a compensation value of the grinding data; and said modification means calculates in accordance with the compensation value to modify the plural grinding data collectively.

* * * * *